(12) United States Patent
Saxe et al.

(10) Patent No.: US 8,925,099 B1
(45) Date of Patent: Dec. 30, 2014

(54) PRIVACY SCORING

(71) Applicant: Reputation.com, Inc., Redwood City, CA (US)

(72) Inventors: James Andrew Saxe, San Mateo, CA (US); Thomas Gerardo Dignan, Mountain View, CA (US)

(73) Assignee: Reputation.com, Inc., Redwood City, CA (US)

( * ) Notice: Subject to any disclaimer, the term of this patent is extended or adjusted under 35 U.S.C. 154(b) by 0 days.

(21) Appl. No.: 13/828,365

(22) Filed: Mar. 14, 2013

(51) Int. Cl.
*G06F 7/04* (2006.01)
*G06F 21/60* (2013.01)

(52) U.S. Cl.
CPC ..................................... *G06F 21/60* (2013.01)
USPC ............................................ 726/26; 713/187

(58) Field of Classification Search
USPC ......................................................... 726/26
See application file for complete search history.

(56) References Cited

U.S. PATENT DOCUMENTS

| | | | |
|---|---|---|---|
| 5,819,258 A | 10/1998 | Vaithyanathan et al. |
| 5,857,179 A | 1/1999 | Vaithyanathan et al. |
| 5,873,081 A | 2/1999 | Harel |
| 5,987,457 A | 11/1999 | Ballard |
| 6,006,218 A | 12/1999 | Breese et al. |
| 6,178,419 B1 | 1/2001 | Legh-Smith et al. |
| 6,182,066 B1 | 1/2001 | Marques |
| 6,324,650 B1 | 11/2001 | Ogilvie |
| 6,484,068 B1 | 11/2002 | Yamamoto et al. |
| 6,510,432 B1 | 1/2003 | Doyle |
| 6,513,031 B1 | 1/2003 | Fries et al. |
| 6,532,459 B1 | 3/2003 | Berson |
| 6,611,825 B1 | 8/2003 | Billheimer et al. |
| 6,678,690 B2 | 1/2004 | Kobayashi et al. |
| 6,766,316 B2 | 7/2004 | Caudill et al. |
| 6,775,677 B1 | 8/2004 | Ando et al. |
| 6,968,333 B2 | 11/2005 | Abbott et al. |
| 6,985,896 B1 | 1/2006 | Perttunen |
| 7,028,026 B1 | 4/2006 | Yang et al. |
| 7,076,558 B1 | 7/2006 | Dunn |
| 7,117,207 B1 | 10/2006 | Kerschberg et al. |
| 7,178,096 B2 | 2/2007 | Rangan et al. |
| 7,289,971 B1 | 10/2007 | O'Neil et al. |
| 7,624,173 B2 | 11/2009 | Bary et al. |
| 7,631,032 B1 | 12/2009 | Refuah et al. |
| 7,634,810 B2 | 12/2009 | Goodman et al. |

(Continued)

FOREIGN PATENT DOCUMENTS

WO   WO02001046868   2/2001

OTHER PUBLICATIONS

Liu et al., "Personalized Web Search by Mapping User Queries to Categories," CIKM, '02, McLean, Virginia, Nov. 4-6, 2002, pp. 558-565.

(Continued)

*Primary Examiner* — Amare F Tabor
(74) *Attorney, Agent, or Firm* — Van Pelt, Yi & James LLP

(57) ABSTRACT

Techniques for privacy scoring are disclosed. In some embodiments, privacy scoring includes collecting information associated with an entity; and generating a privacy score based on the private information that was collected that is associated with the entity. In some embodiments, privacy scoring further includes outputting the privacy score. In some embodiments, privacy scoring further includes determining private information that was collected that is associated with the entity.

20 Claims, 11 Drawing Sheets

(56) References Cited

U.S. PATENT DOCUMENTS

| | | |
|---|---|---|
| 7,640,434 B2 | 12/2009 | Lee et al. |
| 7,653,646 B2 | 1/2010 | Horn et al. |
| 7,792,816 B2 | 9/2010 | Funes et al. |
| 7,818,231 B2 | 10/2010 | Rajan |
| 7,970,872 B2 | 6/2011 | Liu et al. |
| 8,166,406 B1 | 4/2012 | Goldfeder et al. |
| 8,185,531 B2 * | 5/2012 | Nakano |
| 8,234,688 B2 * | 7/2012 | Grandison et al. ............. 726/1 |
| 2002/0016910 A1 | 2/2002 | Wright et al. |
| 2002/0111847 A1 | 8/2002 | Smith |
| 2002/0174230 A1 | 11/2002 | Gudorf et al. |
| 2002/0178381 A1 | 11/2002 | Lee et al. |
| 2003/0014402 A1 | 1/2003 | Sealand et al. |
| 2003/0014633 A1 | 1/2003 | Gruber |
| 2003/0069874 A1 | 4/2003 | Hertzog et al. |
| 2003/0093260 A1 | 5/2003 | Dagtas et al. |
| 2003/0135725 A1 | 7/2003 | Schirmer et al. |
| 2003/0147536 A1 | 8/2003 | Andivahis et al. |
| 2003/0229668 A1 | 12/2003 | Malik |
| 2004/0019584 A1 | 1/2004 | Greening et al. |
| 2004/0019846 A1 | 1/2004 | Castellani et al. |
| 2004/0063111 A1 | 4/2004 | Shiba et al. |
| 2004/0078363 A1 | 4/2004 | Kawatani |
| 2004/0082839 A1 | 4/2004 | Haugen |
| 2004/0088308 A1 | 5/2004 | Bailey et al. |
| 2004/0093414 A1 | 5/2004 | Orton |
| 2004/0122926 A1 | 6/2004 | Moore et al. |
| 2004/0169678 A1 | 9/2004 | Oliver |
| 2004/0267717 A1 | 12/2004 | Slackman |
| 2005/0005168 A1 | 1/2005 | Dick |
| 2005/0050009 A1 | 3/2005 | Gardner et al. |
| 2005/0071632 A1 | 3/2005 | Pauker et al. |
| 2005/0114313 A1 | 5/2005 | Campbell et al. |
| 2005/0160062 A1 | 7/2005 | Howard et al. |
| 2005/0177559 A1 | 8/2005 | Nemoto |
| 2005/0216443 A1 | 9/2005 | Morton et al. |
| 2005/0234877 A1 | 10/2005 | Yu |
| 2005/0251536 A1 | 11/2005 | Harik |
| 2005/0256866 A1 | 11/2005 | Lu et al. |
| 2006/0004716 A1 | 1/2006 | Hurst-Hiller et al. |
| 2006/0015942 A1 | 1/2006 | Judge et al. |
| 2006/0026593 A1 | 2/2006 | Canning et al. |
| 2006/0042483 A1 | 3/2006 | Work et al. |
| 2006/0047605 A1 * | 3/2006 | Ahmad ............................. 705/64 |
| 2006/0047725 A1 | 3/2006 | Bramson |
| 2006/0116896 A1 | 6/2006 | Fowler et al. |
| 2006/0149708 A1 | 7/2006 | Lavine |
| 2006/0152504 A1 | 7/2006 | Levy |
| 2006/0161524 A1 | 7/2006 | Roy et al. |
| 2006/0173828 A1 | 8/2006 | Rosenberg |
| 2006/0174343 A1 | 8/2006 | Duthie et al. |
| 2006/0212931 A1 | 9/2006 | Shull et al. |
| 2006/0253423 A1 | 11/2006 | McLane et al. |
| 2006/0253458 A1 | 11/2006 | Dixon et al. |
| 2006/0253578 A1 | 11/2006 | Dixon et al. |
| 2006/0253580 A1 | 11/2006 | Dixon et al. |
| 2006/0253582 A1 | 11/2006 | Dixon et al. |
| 2006/0253583 A1 | 11/2006 | Dixon et al. |
| 2006/0253584 A1 | 11/2006 | Dixon et al. |
| 2006/0271524 A1 | 11/2006 | Tanne et al. |
| 2006/0287980 A1 | 12/2006 | Liu et al. |
| 2006/0294085 A1 | 12/2006 | Rose et al. |
| 2006/0294086 A1 | 12/2006 | Rose et al. |
| 2007/0073660 A1 | 3/2007 | Quinlan |
| 2007/0101419 A1 | 5/2007 | Dawson |
| 2007/0112760 A1 | 5/2007 | Chea et al. |
| 2007/0112761 A1 | 5/2007 | Xu et al. |
| 2007/0121596 A1 | 5/2007 | Kurapati et al. |
| 2007/0124297 A1 | 5/2007 | Toebes |
| 2007/0130126 A1 | 6/2007 | Lucovsky et al. |
| 2007/0150562 A1 | 6/2007 | Stull et al. |
| 2007/0288468 A1 | 12/2007 | Sundaresan et al. |
| 2008/0021890 A1 | 1/2008 | Adelman et al. |
| 2008/0077517 A1 | 3/2008 | Sappington |
| 2008/0077577 A1 | 3/2008 | Byrne et al. |
| 2008/0082687 A1 | 4/2008 | Cradick et al. |
| 2008/0104030 A1 | 5/2008 | Choi et al. |
| 2008/0109245 A1 | 5/2008 | Gupta |
| 2008/0109491 A1 | 5/2008 | Gupta |
| 2008/0133488 A1 | 6/2008 | Bandaru et al. |
| 2008/0140626 A1 | 6/2008 | Wilson |
| 2008/0165972 A1 | 7/2008 | Worthington |
| 2008/0281807 A1 | 11/2008 | Bartlang et al. |
| 2008/0288277 A1 | 11/2008 | Fasciano |
| 2009/0049528 A1 | 2/2009 | Friedman |
| 2009/0070325 A1 | 3/2009 | Gabriel et al. |
| 2009/0187537 A1 | 7/2009 | Yachin et al. |
| 2009/0216773 A1 | 8/2009 | Konopnicki |
| 2009/0265639 A1 | 10/2009 | Shuster |
| 2009/0292656 A1 | 11/2009 | Raman et al. |
| 2009/0307762 A1 | 12/2009 | Cudd, Jr. |
| 2009/0327026 A1 | 12/2009 | Bistriceanu et al. |
| 2010/0100950 A1 | 4/2010 | Roberts |
| 2010/0198839 A1 | 8/2010 | Basu et al. |
| 2010/0250515 A1 | 9/2010 | Ozonat et al. |
| 2010/0262454 A1 | 10/2010 | Sommer et al. |
| 2010/0262601 A1 | 10/2010 | Dumon et al. |
| 2010/0306834 A1 * | 12/2010 | Grandison et al. ............. 726/7 |
| 2010/0313252 A1 | 12/2010 | Trouw |
| 2011/0016118 A1 | 1/2011 | Edala et al. |
| 2011/0029566 A1 | 2/2011 | Grandison et al. |
| 2011/0060749 A1 | 3/2011 | Petakov et al. |
| 2011/0078049 A1 | 3/2011 | Rehman et al. |
| 2011/0112901 A1 | 5/2011 | Fried et al. |
| 2011/0153551 A1 | 6/2011 | Gabriel et al. |
| 2011/0167474 A1 * | 7/2011 | Sinha et al. .................... 726/1 |
| 2011/0264598 A1 | 10/2011 | Fuxman et al. |
| 2011/0296179 A1 | 12/2011 | Templin et al. |
| 2012/0023332 A1 | 1/2012 | Gorodyansky |
| 2012/0023586 A1 * | 1/2012 | Flickner et al. ............. 726/25 |
| 2012/0180135 A1 | 7/2012 | Hodges et al. |
| 2012/0191594 A1 | 7/2012 | Welch et al. |
| 2013/0006879 A1 * | 1/2013 | Ramanathan et al. ........ 705/319 |
| 2013/0007014 A1 | 1/2013 | Fertik et al. |
| 2013/0035982 A1 * | 2/2013 | Zhang et al. ............. 705/7.29 |
| 2013/0124653 A1 | 5/2013 | Vick et al. |
| 2013/0191466 A1 | 7/2013 | Perlow et al. |

OTHER PUBLICATIONS

PCT Notification of Transmittal of the International Search Report and the Written Opinion of the International Searching Authority for International Application No. PCT/US2012/044668, dated Dec. 21, 2012, 11pages.

Pretschner et al., "Ontology Based Personalized Search," Proc. 11th IEEE International Conference on Tools with Artificial Intelligence, Chicago, Illinois, Nov. 1999, pp. 391-398.

Sugiyama et al., "Adaptive Web Search Based on User Profile Constructed Without Any Effort from Users," ACM, New York, NY, May 17-22, 2004, pp. 675-684.

PCT Notification of Transmittal of the International Search Report and the Written Opinion of the International Searching Authority for International Application No. PCT/US2012/043392, mailed Jan. 25, 2013, 10 pages.

Daranyi et al., Svensk Biblioteksforskning; Automated Text Categorization of Bibliographic Records; Boras Academic Digital Achieve (BADA); artice peer reviewed [on-line], Hogskolan I Boras, vol. 16, Issue 2, pp. 1-14 as paginated or 16-29 as unpaginated of 47 pages, 2007 [retrieved on Nov. 6, 2012].

* cited by examiner

PRIVACY SCORING

BACKGROUND OF THE INVENTION

Individuals are increasingly concerned with their privacy. For example, private information associated with individuals can be available online or in the possession of third parties. Such private information can be personal and/or can be confidential such that access to such private information can pose personal and/or financial risks. It is becoming increasingly difficult for individuals to determine if any such private information is available online or in the possession of third parties.

BRIEF DESCRIPTION OF THE DRAWINGS

Various embodiments of the invention are disclosed in the following detailed description and the accompanying drawings.

DETAILED DESCRIPTION

Figure 1:
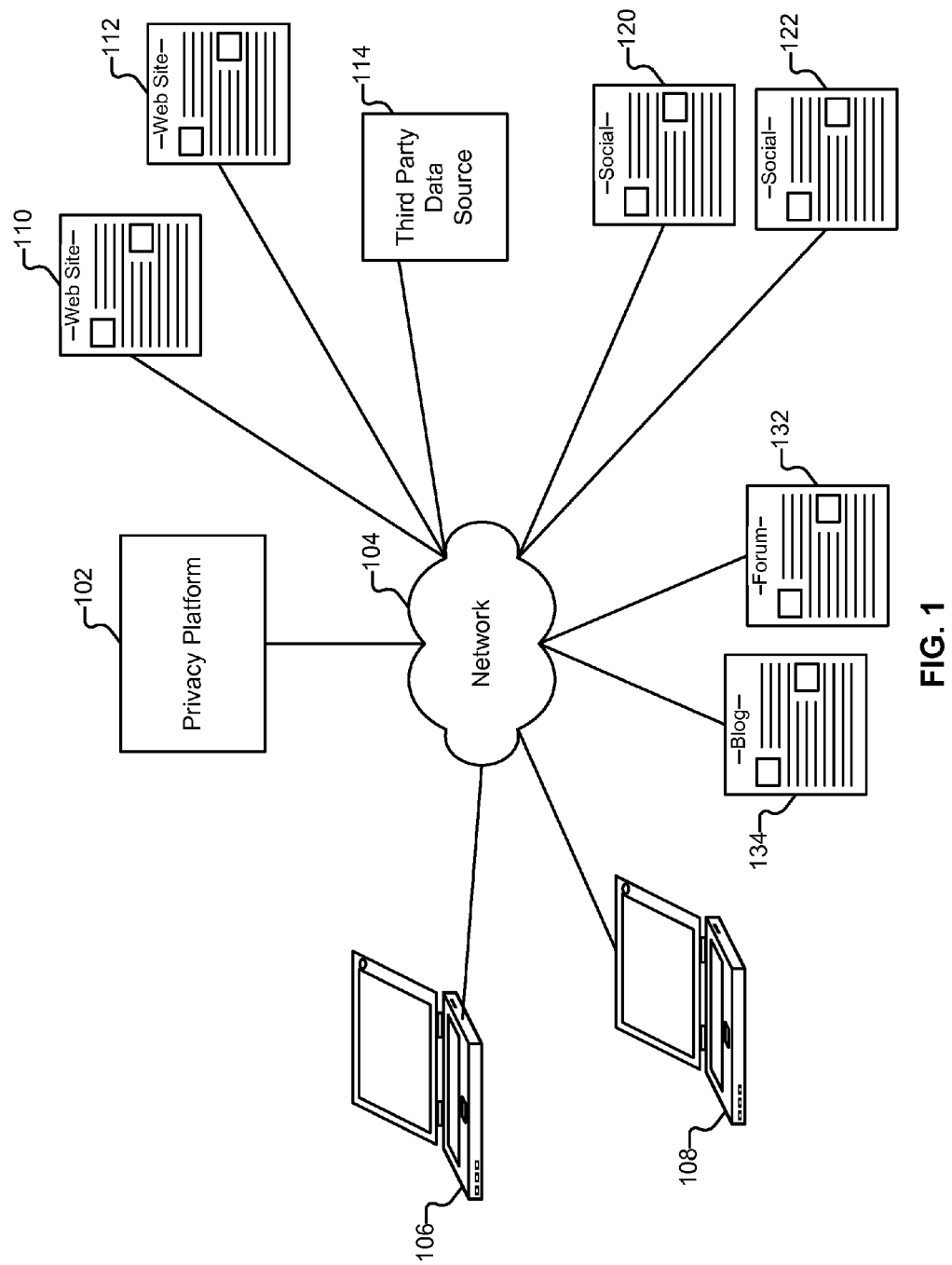
FIG. 1 illustrates a functional block diagram of a computing environment for privacy reporting in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Individuals are increasingly concerned with their privacy. For example, private information associated with individuals can be available online or in the possession of third parties. Such private information can be personal and/or can be confidential such that access to such private information can pose personal and/or financial risks. It is becoming increasingly difficult for individuals to determine if any such private information is available online or in the possession of third parties (e.g., authorized third parties, or in some cases, unauthorized third parties).

What are needed are new and improved techniques for entities, such as users and/or other entities, to determine whether private information is available online or in the possession of third parties. For example, private information can refer to any information that a user deems or desires to be maintained as private to the user and/or otherwise not generally available to the public or third parties (e.g., without user's authorization). Various example types or categories of private information are described herein with respect to various embodiments.

Accordingly, techniques for privacy scoring are disclosed. In some embodiments, privacy scoring includes collecting information associated with an entity; and generating a privacy score based on the private information that was collected that is associated with the entity. In some embodiments, privacy scoring further includes determining private information that was collected that is associated with the entity.

In some embodiments, privacy scoring further includes outputting the privacy score. In some embodiments, privacy scoring further includes outputting a privacy report that includes the privacy score. In some embodiments, privacy scoring further includes outputting a privacy report that includes the privacy score, wherein the privacy score corresponds to an overall privacy score. In some embodiments, privacy scoring further includes outputting a privacy report that includes the privacy score and a recommendation to improve the privacy score.

In some embodiments, privacy scoring further includes alerting the entity based on the privacy score. In some embodiments, privacy scoring further includes periodically collecting information associated with the entity; and updating the privacy score. In some embodiments, privacy scoring further includes periodically collecting information associated with the entity; updating the privacy score; and alerting the entity that the privacy score has been updated.

In some embodiments, privacy scoring further includes verifying that the private information is associated with the entity (e.g., based on entity feedback and/or using various other techniques, such as described herein). In some embodiments, privacy scoring further includes verifying that the private information is associated with the entity and is private data (e.g., based on entity feedback and/or using various other techniques, such as described herein).

In some embodiments, privacy scoring further includes periodically collecting information associated with the entity. In some embodiments, privacy scoring further includes collecting information associated with the entity using an application programming interface to request data from a third party data source (e.g., to collect structured data related to the entity). In some embodiments, privacy scoring further includes collecting information associated with the entity using a site scraper to extract data from a web site (e.g., to collect unstructured data related to the entity). In some embodiments, privacy scoring further includes collecting information associated with the entity using a search engine to extract data from a plurality of web sites (e.g., to collect unstructured data related to the entity).

Privacy Platform

FIG. 1 illustrates a functional block diagram of a computing environment for privacy reporting in accordance with some embodiments. In particular, FIG. 1 illustrates an environment in which private information of an entity (e.g., a user) is collected, analyzed, and presented.

For example, a privacy report can be output to a user. The privacy report can provide an analysis of the user's digital footprint (e.g., exposed user related data on the Internet and other publicly available data sources) and analyze their exposed private data (age, birth date, social security number, and/or other personal, confidential, or sensitive information), such as what data is exposed, where such private information is exposed, how it was exposed (e.g., to potentially infer that such data may have been exposed when the user signed up with an account with a particular third party entity or from a court record), and/or what it is being used for (e.g., targeted marketing activities, stalking activities, and/or other activities). The privacy report can also include recommendations to the user to reduce their privacy risks.

As another example, a privacy score (e.g., privacy report that includes a privacy score) can be output to a user. The privacy score can provide a score that is based on a privacy risk analysis of the user's digital footprint (e.g., exposed user related data on the Internet and other publicly available data sources) and analyze their exposed private data (age, birth date, and/or other personal, confidential, or sensitive information). For example, the privacy score can be provided along with the privacy report or as part of the privacy report to provide the user with an objective and/or relative privacy risk based measure and to facilitate the user being able to gauge their private data exposure and risks. The privacy report can also include recommendations to the user to improve their privacy score and reduce their privacy risks.

In the example shown, the user of client device 106 (hereinafter referred to as "Bob") owns his own business ("Bob's Company"). The user of client device 108 (hereinafter referred to as "Alice") is employed by a national company ("ACME Company"). As will be described in more detail below, Bob and Alice can each access the services of privacy platform 102 via network 104, such as the Internet, to determine whether any of their private information is available online and/or in the possession of third parties. The techniques described herein can work with a variety of client devices 106-108 including, but not limited to personal computers, tablet computers, smartphones, and/or other computing devices.

In some embodiments, privacy platform 102 is configured to collect personal data and other data determined to be potentially associated with a user from a variety of sources, including websites 110-112, third party data sources 114, social networking websites 120-122, and other Internet or web based sources, such as blogs and forums 132-134. In some embodiments, users of the privacy platform 102, such as Alice and Bob, can also provide user related data to privacy platform 102, such as their full legal name, residence address(es), email address(es), phone number(s), employment information, age, birth date, and/or other personal or identifying information that can be used by the privacy platform to identify information that may be associated with the user (e.g., to perform targeted data collection and private data isolation as further described herein). In the examples described herein, web sites 110-112 can be any form of web site that can include content about entities, such as users, associations, corporations, government organizations, and/or other entities. Examples of social networking sites 120 and 122 include Facebook, Twitter, and Foursquare. In some examples, social networking sites 120-122 can allow users to take actions such as "checking in" to locations. Finally, personal blog 134 and online forum 132 are examples of other types of websites "on the open Web" that can include information that may be considered private by a user or other entity.

Platform 102 is illustrated as a single logical device in FIG. 1. In various embodiments, platform 102 is a scalable, elastic architecture and may comprise several distributed components, including components provided by one or more third parties. Further, when platform 102 is referred to as performing a task, such as storing data or processing data, it is to be understood that a sub-component or multiple sub-components of platform 102 (whether individually or in cooperation with third party components) may cooperate to perform that task.

Account/Entity Setup

Figure 2:
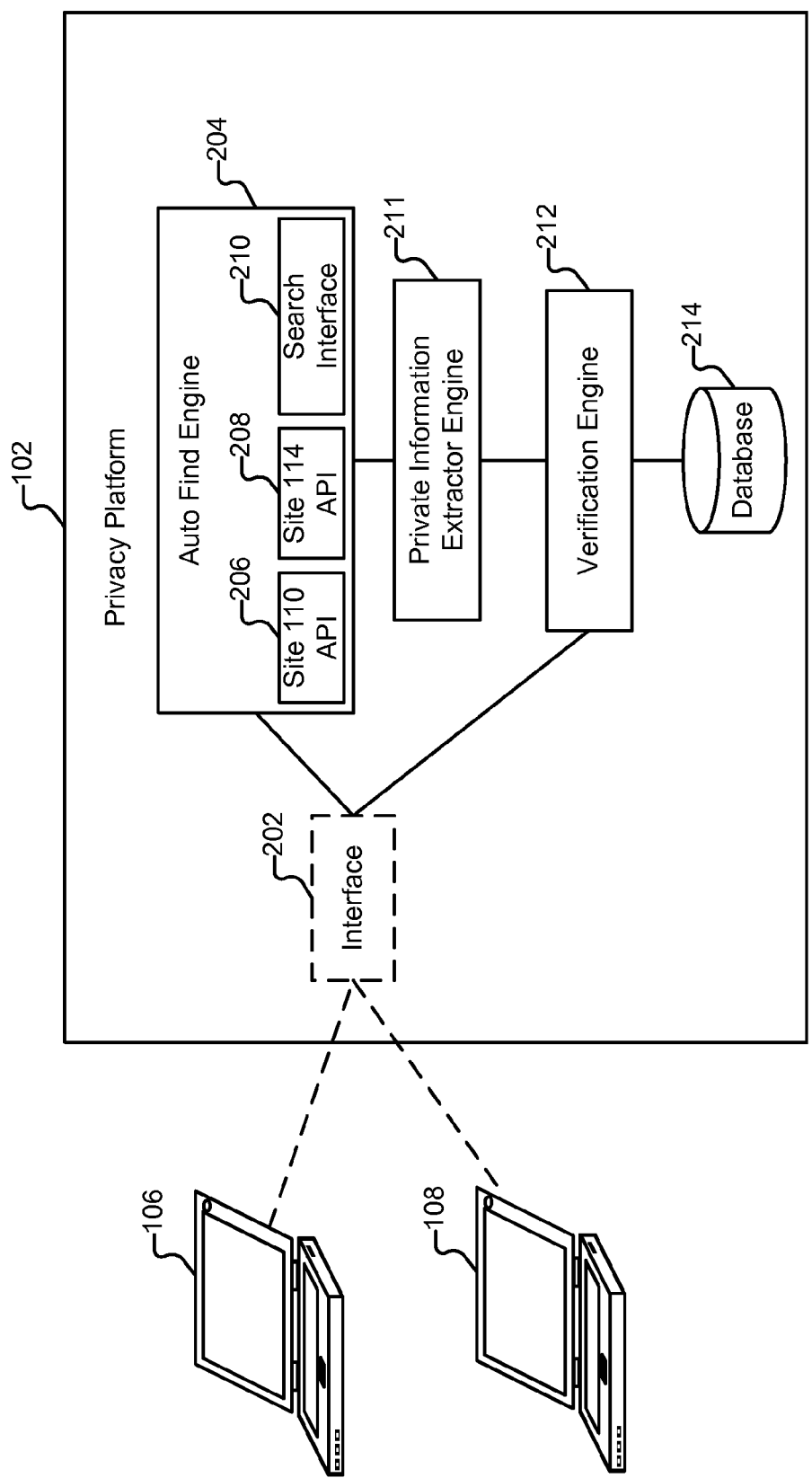
FIG. 2 illustrates an example of components included in a privacy platform in accordance with some embodiments.

FIG. 2 illustrates an example of components included in a privacy platform in accordance with some embodiments. In particular, FIG. 2 illustrates components of platform 102 that are used in conjunction with a new entity setup process.

For example, in order to access the services provided by privacy platform 102, Bob first registers for an account with the platform. At the outset of the process, he accesses interface 202 (e.g., a web-based interface) and provides information such as a desired username and password for his new account with the platform. He also provides payment information (if applicable). If Bob has created accounts for, for example, himself, his family, and/or his business on social networking sites such as sites 120 and 122, Bob can identify those accounts to platform 102 as well. In some cases, Bob can call the service provider to register and/or setup accounts via a telephony based registration/account set-up process.

Next, Bob is prompted by platform 102 to provide the name of the entity that he wants to perform the privacy platform services for, which in this case, it is assumed that this would be for himself, such that Bob can input his full legal name (e.g., "Bob Smith"), his personal residence address (e.g., "123 Peachtree St.; Atlanta, Calif. 30303), and (optionally) the type of information that he deems to be private information (e.g., birthdate, social security number, health information, hobbies, and/or other information). This information entered by Bob is provided to auto find engine 204, which is configured to locate, across web sites on the Internet (e.g., World Wide Web) and/or various other online third party data sources, any information that is determined to be associated with Bob, if present. The data collection performed by auto find engine can include structured data collection and unstructured data collection. For example, web sites 110-112 can be identified to have information potentially associated with Bob based on content analysis (e.g., using various natural language processing techniques). In some embodiments, a search engine, such as Bing, Google, and/or Yahoo, is used to identify URLs of particular web sites that include relative content using search interface 210 of auto find engine 204.

In the example shown in FIG. 2, web site 110 and third party data source 114 make available respective application programming interfaces (APIs) 206 and 208 that are usable by auto find engine 204 to locate information that is potentially associated with entities such as Bob on their sites. Site 112 does not have a profile finder API. In order to locate information that is potentially associated with entities there, auto find engine 204 is configured to perform a site-specific search using a script that accesses a search engine (e.g., through search interface 210). As one example, a query of: "site:www.examplesite.com 'Bob Smith' 'Atlanta'" could be submitted to the Google search engine using interface 210.

In some embodiments, auto find engine 204 also determines trackers associated with a user's browser (e.g., tracker cookies cached on a user's client device, such as Bob's laptop 106) to determine which companies are tracking Bob Smith (e.g., by looking at cookies stored locally on Bob Smith's browser/client). For example, various inferences can be made based on such trackers and using information from third party sources that classify such trackers as further described herein.

In some embodiments, private information extractor engine 211 extracts potentially private information from the information that is collected by auto find engine 204. For example, structured information can be processed (e.g., based on fields of the structured data) to extract potentially relevant private information associated with Bob. In addition, unstructured information can be processed (e.g., using content based analysis techniques) to extract potentially relevant private information associated with Bob.

In some embodiments, results obtained by private information extractor engine 211 are provided to verification engine 212, which confirms whether such information is associated with the entity of interest, which is Bob in this example. In some embodiments, verification engine 212 also determines whether such information includes private information associated with the entity of interest, which is Bob in this example. Verification engine 212 can be configured to verify all results (including any obtained from sources 110-134), and can also be configured to verify (or otherwise process) just those results obtained via interface 210. As one example, for a given query, the first ten results obtained from search interface 210 can be examined. The result that has the best match score and also includes the expected entity name and physical address is designated as potentially relevant information on the queried site. As another example, based on verification and entity feedback, the collection process can be iteratively performed to execute more targeted data collection and private information extraction based on the verification and entity feedback to improve results (e.g., refined searches can be performed using the search interface 210 in subsequent iterations of the data collection and private information extraction process).

In some embodiments, verification engine 212 presents results to Bob for verification that the potentially private information corresponds to information that is associated with Bob. In some embodiments, verification engine 212 also presents results to Bob for verification that the potentially private information includes Bob's private information. As an example, Bob may be shown (via interface 202) a set of URLs on each of the sites 110-112 and extracted information from such URLs that were previously determined by private information extractor engine 211 and auto find engine 204 to including potentially private information associated with Bob. Once confirmed by Bob, the source (e.g., URLs, third party data source, ad tracker network, and/or other source identifying information) along with the verified private information (e.g., extracted from the third party data source), tracker information, and any other appropriate data are stored in database 214. Examples of such other data can include information associated with the data source (e.g., classification of the data source, reputation of the data source, prominence of the data source, and/or other information) and/or any social data (e.g., obtained from social sites 120-122).

Figure 3:
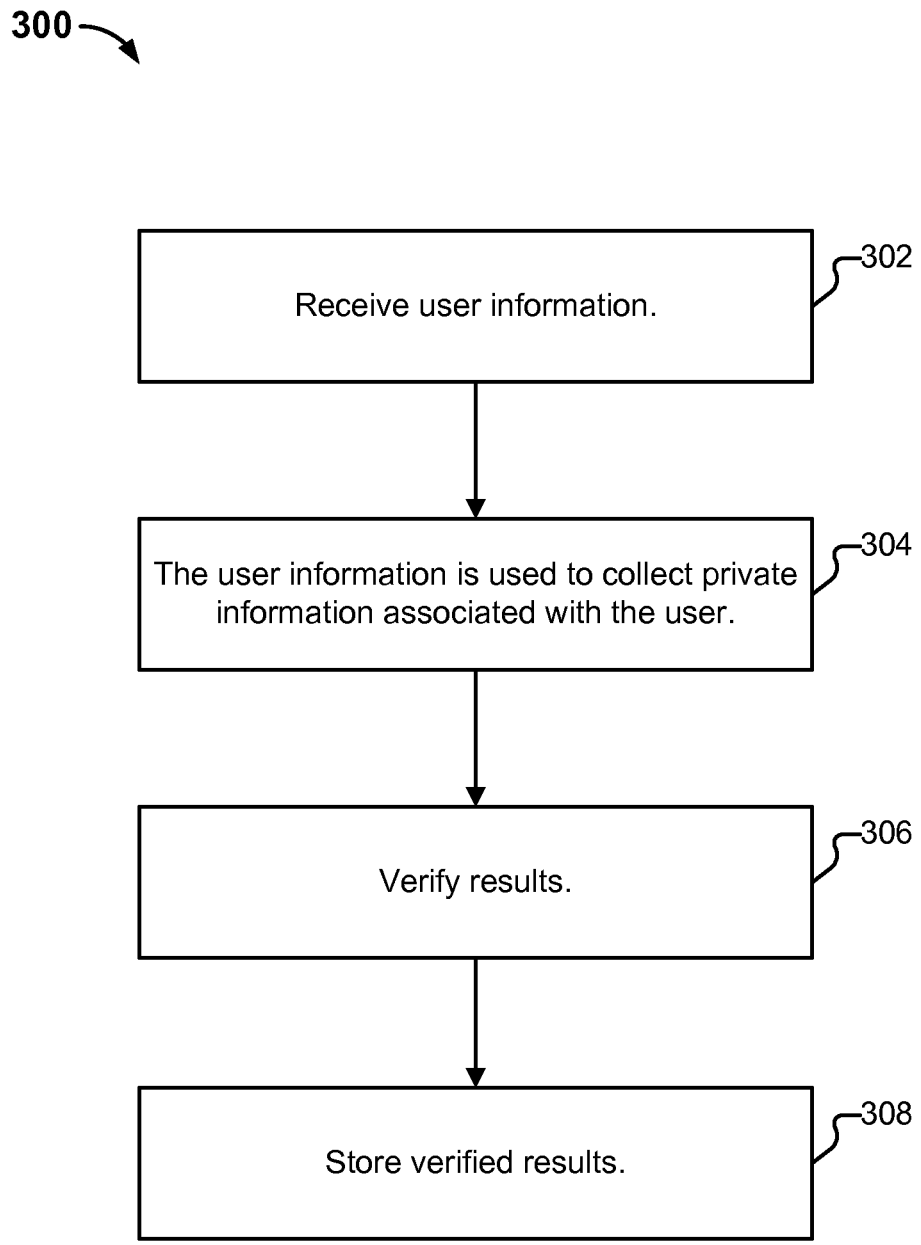
FIG. 3 illustrates an embodiment of a process for enrolling an entity with a privacy platform in accordance with some embodiments.

FIG. 3 illustrates an embodiment of a process for enrolling an entity with a privacy platform in accordance with some embodiments. In some embodiments, process 300 is performed by platform 102 for enrolling an entity for the privacy reporting service and/or privacy scoring service, such as a new user. The process begins at 302 when user information is received. As one example, when Bob provides his user information, as similarly discussed above, to platform 102 via interface 202, and that user information is received at 302. At 304, the received user information is used to collect potentially relevant private information associated with the user, which is Bob in this example. As an example of the processing performed at 304, the received user name is provided to site 110 using API 206. As another example, a site-specific query (e.g., of site 112) is submitted to a search engine via search interface 210. As yet another example, a search query (e.g., of the Internet) is submitted to a search engine via search interface 210.

At 306, results of the private information data collection performed at 304 are verified. As one example of the processing performed at 304, verification engine 212 performs checks such as confirming that various user information received at 302 is present in a given result (e.g., using content analysis techniques and threshold matching techniques). As another example, a user can be asked to confirm that results are associated with the user and that private information is included in such results, and if so, that confirmation is received as a verification at 306. Finally, at 308, verified results are stored. As an example, source identifiers (e.g., URLs or other source identifying information) for each of the verified results are stored in database 214. Although pictured as a single database in FIG. 2, in various embodiments, platform 102 makes use of multiple storage modules, such as multiple databases. Such storage modules may be of different types. For example, user account and payment information can be stored in a MySQL database or another data store, while extracted private information (described in more detail below) can be stored using MongoDB or another data store. In some embodiments, extracted private information is only temporarily stored (e.g., in memory, such as using an in-memory database) to provide sufficient time for the privacy platform 102 to generate and output a privacy report and/or a privacy report with a privacy score to the entity, such as to provide that output to Bob, as further described herein.

Data Collection and Processing

Figure 4:
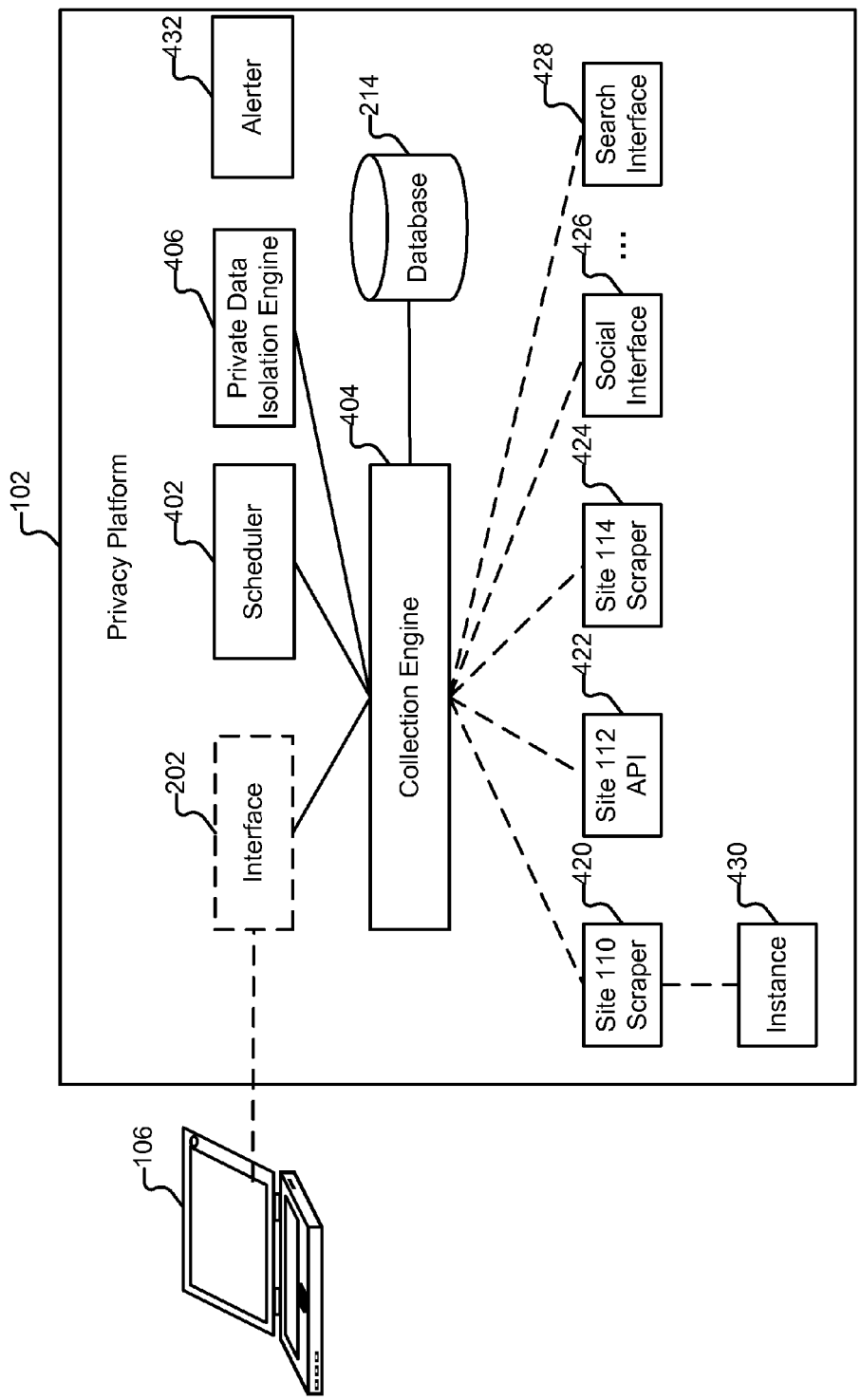
FIG. 4 illustrates another example of components included in a privacy platform in accordance with some embodiments.

FIG. 4 illustrates another example of components included in a privacy platform in accordance with some embodiments. In particular, FIG. 4 illustrates components of platform 102 that are used in conjunction with the ongoing collection and processing of data.

In some embodiments, once an entity (e.g., Bob Smith) has an account on privacy platform 102, collecting and processing of potentially relevant private data is performed. As shown, platform 102 includes a scheduler 402 that periodically instructs collection engine 404 to obtain data from sources such as sources 110-34. Scheduler 402 can be configured to initiate data collection based on a variety of rules. For example, it can cause data collection to occur once a day for all customers (e.g., enrolled entities) across all applicable sites. It can also cause collection to occur with greater frequency for certain entities (e.g., which pay for premium services) than others (e.g., which have free accounts). Further, collection can be performed across all sources (e.g., sources 110-134) with the same frequency or can be performed at different intervals (e.g., with collection performed on site 110 once per day and collection performed on site 112 once per week).

In addition to or instead of the scheduled collection of data, data collection can also be initiated based on the occurrence of an arbitrary triggering event. For example, collection can be triggered based on a login event by a user such as Bob (e.g., based on a permanent cookie or password being supplied). Collection can also be triggered based on an on-demand refresh request by the user (e.g., where Bob clicks on a "refresh my data" button in interface 202).

In some embodiments, private data isolation engine 406 performs extraction of potentially private information associated with an entity. In some embodiments, the private data isolation engine extracts private information from structured data sets and from unstructured data sets using various techniques. For example, structured data set analysis can be performed using fields, such as name, address, past address, birth date, religion, race/ethnicity, education level, social security number, parent's names, occupation, health information/ medical records, and so forth. As another example, unstructured data set analysis can be performed using various natural language processing (NLP) and contextual analysis techniques to perform entity extraction; determine associations with a particular entity, like occupation, phone number, hobby, political party, action taken (e.g., visited Stone Mountain Park in Atlanta, Ga.); perform inferences; and use verification techniques (e.g., including a user based feedback verification). In some embodiments, the verification provides a feedback loop that can be used by the private data isolation engine to become more accurate to provide refined data collection and private data isolation for a given entity. In some embodiments, the private data isolation engine includes a classifier engine.

In some embodiments, extracted structural data is used to facilitate identifying a user such as Bob, and the structured data can then be used to filter the unstructured data using various techniques described herein. For example, Bob can initially provide the platform with relevant user information (e.g., Bob Smith, Atlanta, Ga. and possibly other information). The collection engine of the platform can send requests to third party data sources (e.g., Spokeo and/or other sources) using API based queries based on such relevant user information. The platform receives back structured data set results based on such queries. The private data isolation engine of the platform can isolate information that is relevant to the user and provide that as input to the collection engine, which can then perform web based crawling and/or targeted searches using search engine(s) to collect additional data that may be relevant to the user, in which such additionally collected information can included structured data and unstructured data. The private data isolation engine of the platform can also isolate information that is relevant to the user from such structured data and unstructured data. The private data isolation engine can further process the isolated information determined to be relevant to the user to extract and store (e.g., at least temporarily) potentially private data determined to be associated with the user. In some embodiments, the verification engine can verify whether the potentially private data is associated with Bob and may include private information associated with Bob (e.g., which can also include user feedback from Bob based on the extracted results). The verified results can then be used to generate a privacy report and/or a privacy report with a privacy score for Bob as further described herein. In some embodiments, such collected and extracted information is stored temporarily (e.g., in memory) for analysis, processing, and reporting purposes but need not be stored permanently or archived for longer periods of time.

In some embodiments, the private data isolation engine also ranks sources. For example, a source that is more prominent or widely accessed can be given a higher rank than a less prominent source (e.g., a Google search result on page 1 can be deemed more prominent than a Google search result on page 100, and a Lexis Nexis search result can be deemed more prominent than a less widely used source, such as a particular individual's personal blog). The ranking of the source can be relevant information that is identified in a privacy report and/ or used as a factor or weighting factor in calculating a privacy score that is generated and output to the user.

Other elements depicted in FIG. 4 will be described in conjunction with process 500 shown in FIG. 5.

Figure 5:
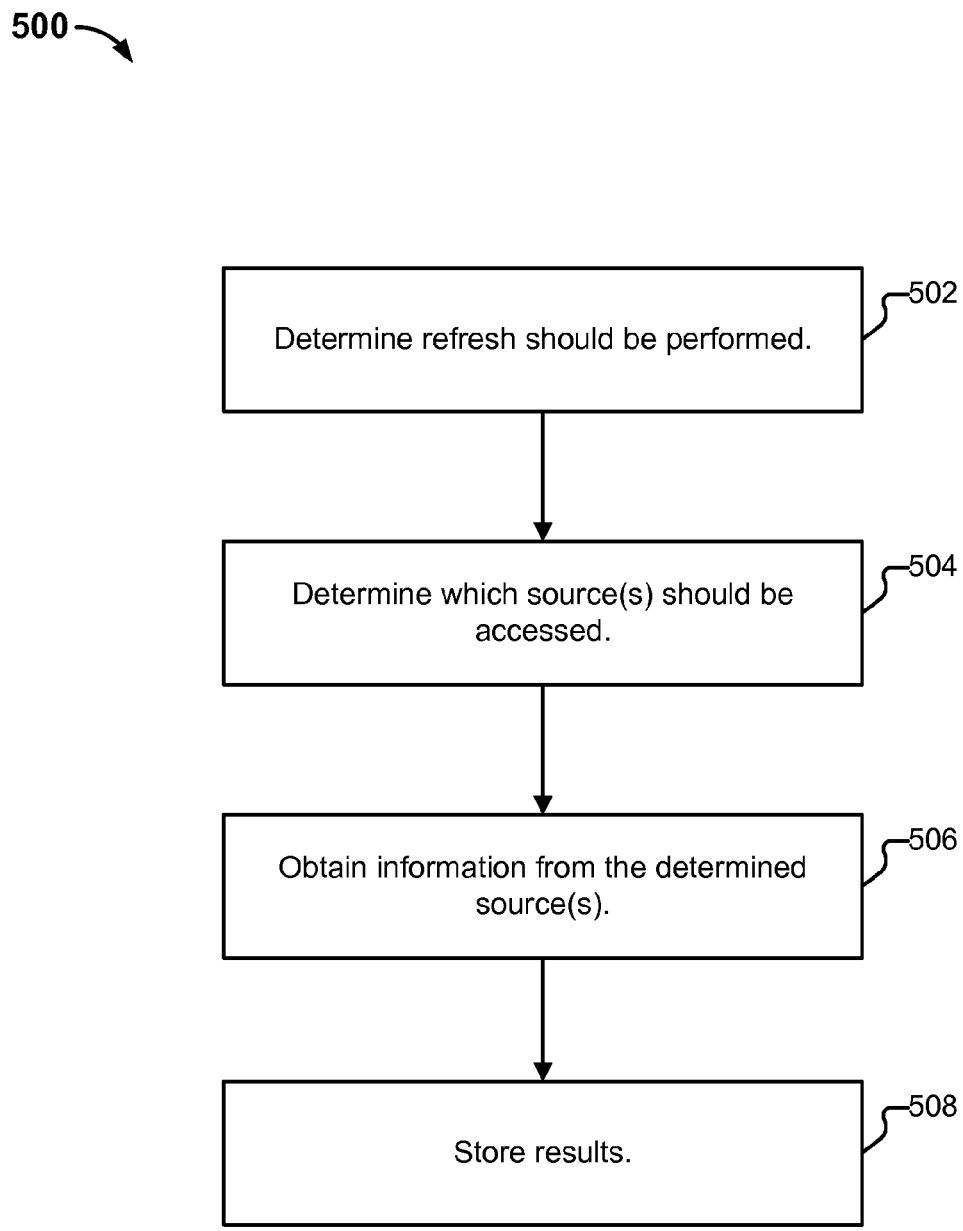
FIG. 5 illustrates a flow diagram of a process for refreshing collected private information data in accordance with some embodiments.

FIG. 5 illustrates a flow diagram of a process for refreshing collected private information data in accordance with some embodiments. In some embodiments, process 500 is performed by platform 102. The process begins at 502 when a determination is made that a data refresh should be performed. As an example, such a determination is made at 502 by scheduler 402 based on an applicable schedule. As another example, such a determination is made at 502 when a triggering event (e.g., a login event by Bob or another triggering event, such as Bob clicks a "refresh my data" button using interface 202) is received by platform 102.

At 504, a determination is made as to which sources should be accessed. As an example, collection engine 404 can review a set of stored sources in database 214 for Bob based on a prior private information data collection process executed for Bob. The set of stored sources associated with Bob are the ones that will be used by collection engine 404 during the refresh operation. As previously mentioned, a refresh can be performed on behalf of multiple (or all) entities, instead of an individual one such as Bob. In such a scenario, portion 504 of the process can be omitted as applicable. In some embodiments, additional sources can also be accessed during a refresh operation and such sources need not be limited to the set of previously identified set of sources associated with Bob based on a prior data collection operation for Bob.

At 506, information is obtained from the sources determined at 504. As shown in FIG. 4, collection engine 404 makes use of several different types of source data collection engines 420-428. Each source data collection engine (e.g., source data collection engine 420) is configured with instructions to fetch data from a particular type of source. As an example, data can be scraped from a source (e.g., a web site) by platform 102 using a site scraper. In particular, when a determination is made that private information associated with Bob on site 110 should be refreshed by platform 102, an instance 430 of source data collection engine 420 is executed on platform 102. Instance 430 is able to extract potentially private data on site 110 using site scraper 110. Source data collection engine 424 is configured with instructions for scraping potentially private data from site 114 using site scraper 114. Site 112 has made available an API for obtaining potentially private data and source data collection engine 422 is configured to use that API.

Other types of source data collection engines can extract other types of data and/or communicate with other types of sources. As an example, source data collection engine 426 is configured to extract potentially private data from social site 120 using an API provided by site 120, such as a Spokeo, which is a person search site that provides API to pass a person's name and their City, State (e.g., Bob Smith, Atlanta, Ga.) to get their previously collected data. As another example, when an instance of source data collection engine 428 is executed on platform 102, a search is performed across the World Wide Web for blog, forum, or other web pages that may discuss potentially private data associated with Bob. In some embodiments, additional processing is performed on any results of such a search, such as content analysis to verify whether such information is associated with Bob and whether such information includes potentially relevant private information associated with Bob.

In various embodiments, information, obtained on behalf of a given entity such as Bob (or Bob's Company) or Alice (or ACME Company), is retrieved from different types of sites in accordance with different schedules. For example, while general web site data can be collected hourly, or on demand, social data (collected from sites 120-122) can be collected once a day. Data can be collected from sites on the open Web (e.g., web sites, editorials, blogs, forums, and/or other sites) once a week.

At 508, any new results (i.e., those not already present in database 214) are stored in database 214. As needed, the results are processed prior to being included in database 214. In various embodiments, database 214 supports heterogeneous records and such processing is omitted or modified as applicable.

Prior to the first time process 500 is executed with respect to Bob, no previously collected private information data associated with Bob is present in database 214. Portion 506 of the process is performed for each of the data sources applicable to Bob (via instances of the applicable source data collection engines), and the collected data is stored at 508. On subsequent refreshes of data pertinent to Bob, only new/changed information is added to database 214. In various embodiments, alerter 432 provides an alerting engine that is configured to alert Bob (e.g., via an email message, phone call, text message, or another form of communication) whenever process 500 (or a particular portion thereof) is performed with respect to his account. In some cases, alerts are only sent when new private information associated with Bob is collected, and/or when privacy scores associated with Bob (described in more detail below) change, or change by more than a threshold amount.

Privacy Reporting

Platform 102 is configured to generate a variety of privacy reports on behalf of entities including users, such as Bob and Alice, and businesses or other entities, such as Bob's Company and ACME Company. As will be described in more detail below, the privacy reports provide users with perspective on whether their private information is available online or in the possession of third parties. For example, a privacy report can detail what private information associated with Bob is available online or in the possession of third parties, where such private information is available, who has access to such private information, and possibly an intended use by third parties who are determined to have access to such private information.

Figure 6:
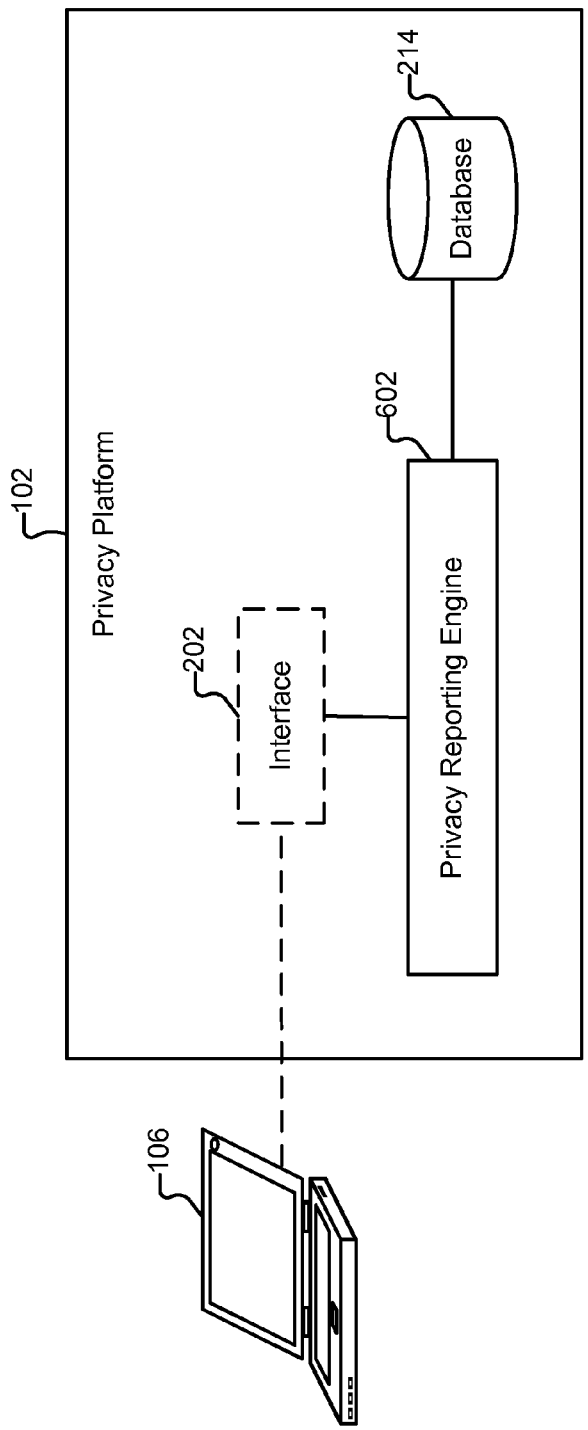
FIG. 6 illustrates an example of components included in a privacy platform that performs privacy reporting in accordance with some embodiments.

FIG. 6 illustrates an example of components included in a privacy platform that performs privacy reporting in accordance with some embodiments. In particular, FIG. 6 illustrates components of platform 102 that are used in conjunction with generating privacy reports. In some embodiments, platform 102 includes a privacy reporting engine 602 that generates privacy reports for entities based on entity related data collection and private data isolation techniques as similarly described herein with respect to various embodiments. In some embodiments, platform 102 includes components as similarly described above with respect to FIG. 4 in addition to the privacy reporting engine 602 that can report on the verified private data associated with an entity that was collected and extracted, as further described below.

In some embodiments, privacy reporting performed by privacy platform 102 includes collecting information associated with an entity (e.g., Bob, Alice, or another entity); and generating a privacy report based on private information that was collected that is associated with the entity. In some embodiments, privacy reporting further includes outputting the privacy report, such as shown in FIG. 7 as described below.

Figure 7:
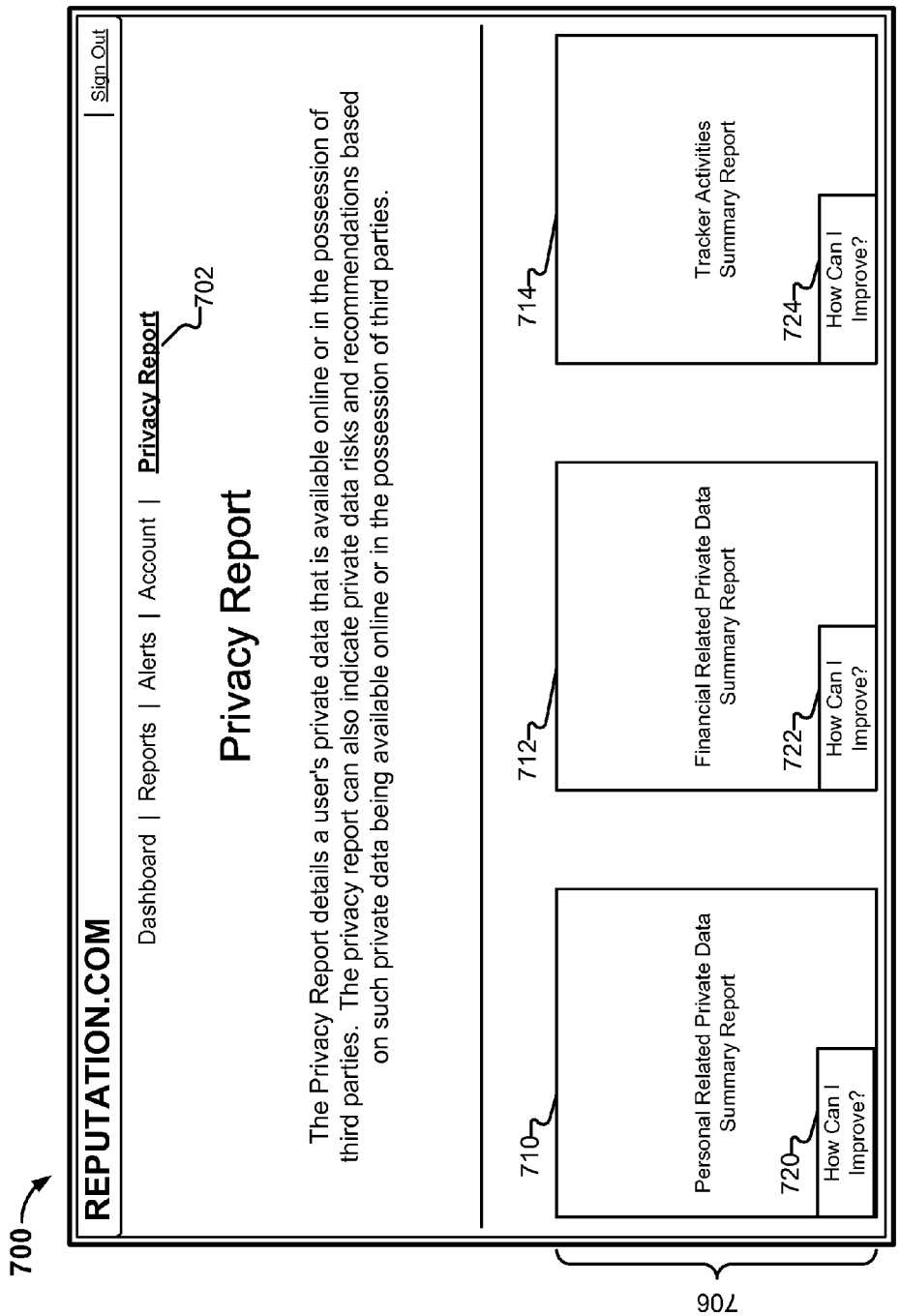
FIG. 7 illustrates an example of an interface as rendered in a browser of a privacy report in accordance with some embodiments.

FIG. 7 illustrates an example of an interface as rendered in a browser of a privacy report in accordance with some embodiments. In particular, Bob is presented with interface 700 after logging in to his account on platform 102 using a browser application on client device 106 and clicking on tab option 702 for a privacy report.

In some embodiments, whenever Bob accesses platform 102 (and/or based on the elapsing of a certain amount of time), the privacy report shown in FIG. 7 is refreshed. In particular, privacy reporting engine 602 retrieves, from database 214 (e.g., or from memory based on a recollection process as similarly discussed above), private data pertaining to Bob and generates the privacy report shown in FIG. 7. Example ways of providing a privacy report are as follows.

In region 706 of interface 700, various privacy report data are presented including various summary reports for different categories of private data. In particular, the summary reports provide Bob with a quick perspective on what private information associated with Bob is available online or in the possession of third parties. Three example categories are shown in region 706, each of which is discussed below. A category 710 for personal related private data summary report is provided to indicate to Bob what personal related private data (e.g., birthdate, mother's maiden name, father's birthdate, and/or other personal related private data) is available online or in the possession of third parties. A category 712 for financial related private data summary report is provided to indicate to Bob what financial related private data (e.g., financial account information, and/or other personal related private data) is available online or in the possession of third parties. A category 714 for tracker activities summary report is provided to indicate to Bob what trackers may be tracking Bob's online activities and what private data such trackers may have obtained and how that private data may be used by such trackers (e.g., ad tracker networks).

In some embodiments, the summary reports include links or drill-down options to view more information, such as regarding a particular set of private data that was collected, a particular source of such private data, and how such private data may be used by the source or other third parties (e.g., based on stated policies associated with such third parties, past behaviors of such third parties, inferences, and/or other techniques). In some embodiments, for each category, Bob can see tips on how to improve his private data access online and/or with third parties by clicking on an appropriate box (e.g., boxes 720-724 for tips on improving privacy). Example recommendations can include what data should be removed from a site/source, what cookies to remove from a user's client browser, what information to not use for security/password and/or user identity verification purposes (e.g., do not use your mother's maiden name, your birthdate, and/or other information), deleting an account with a particular third party, stopping the flow into the ecosystem (e.g., recommending that a user opt out of being tracked, such as using the browser cookie no track mechanism from a service provider to stop third party cookie tracking) In some embodiments, such boxes are only displayed for privacy issues that can/should be improved.

Figure 8:
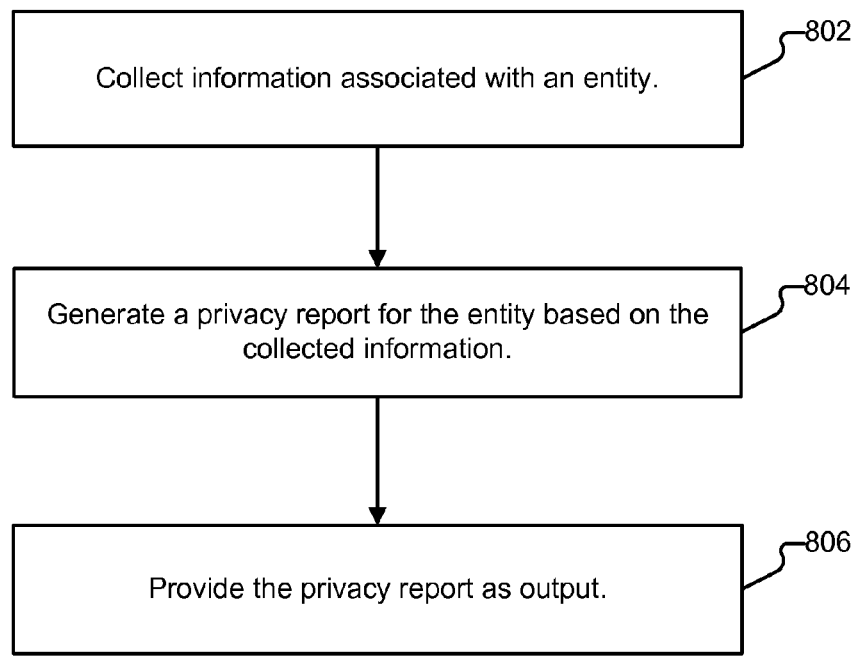
FIG. 8 illustrates a flow diagram of a process for privacy reporting in accordance with some embodiments.

FIG. 8 illustrates a flow diagram of a process for privacy reporting in accordance with some embodiments. In some embodiments, process 800 is performed by platform 102. The process begins at 802 when data obtained from each of a plurality of sites/sources is received. In particular, at 802, information associated with an entity is collected. As an example, process 800 begins at 802 when Bob logs into platform 102 and, in response, reporting engine 602 retrieves private data associated with Bob from database 214. In addition to generating privacy reports on demand, privacy reports can also be generated as part of a batch process. As one example, privacy reports across a set or group/class of users can be generated once a week. In such situations, the process begins at 802 when the designated time to perform the batch process occurs and data is received from database 214. In various embodiments, at least some of the data received at 802 is obtained on-demand directly from the sources/sites (instead of or in addition to being received from a storage, such as database 214).

At 804, a privacy report for the entity based on the collected information is generated (e.g., using privacy reporting engine 602). Various techniques for generating privacy reports are discussed above. Other approaches can also be used, such as by generating a privacy report for each of the categories of private data associated with Bob to provide a composite report based on those category reports.

Finally, at 806, the privacy score is output (e.g., using interface 700). As an example, a privacy report is provided as output in region 706 of interface 700. As another example, privacy reporting engine 602 can be configured to send privacy reports to users via email (e.g., using an alerting engine, such as alerter 432).

As will now be apparent to one of ordinary skill in the art in view of the embodiments described herein, various other forms of privacy reporting can be output using the privacy platform and various techniques described herein. For example, a timeliness factor can also be reported to indicate a last time a source was visited for private data collection. As another example, information about sources determined to have private data associated with the entity can also be reported (e.g., a reputation of such sources in terms of how such sources use private data of users). Further, the various privacy factors described above need not all be presented or output in the privacy report nor need they be employed in the manners described herein. Additional factors can also be used when generating a privacy report.

In some embodiments, a privacy report is provided that also includes a privacy score to provide a scoring based metric to inform an entity of their privacy risks is discussed below.

Privacy Scoring

An example computation of a privacy score that can be included in a privacy report is discussed below in conjunction with FIGS. 9-11.

Figure 9:
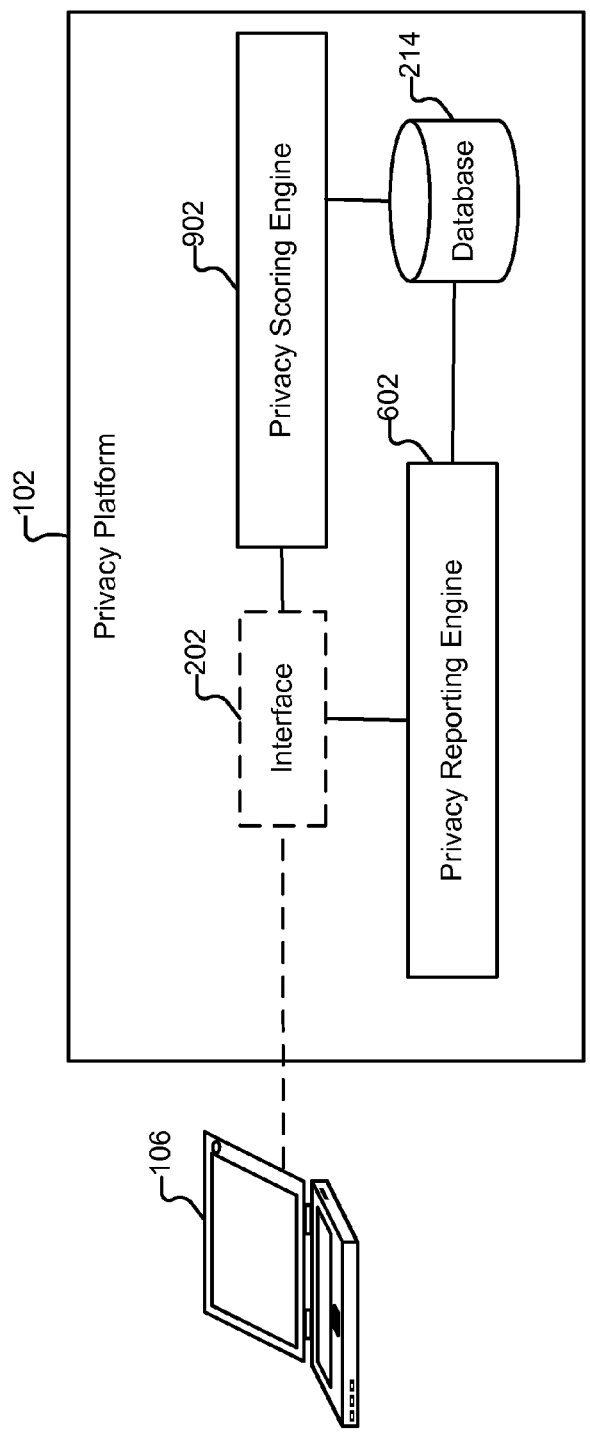
FIG. 9 illustrates an example of components included in a privacy platform that performs privacy scoring in accordance with some embodiments.

FIG. 9 illustrates an example of components included in a privacy platform that performs privacy scoring in accordance with some embodiments. In particular, FIG. 9 illustrates components of platform 102 that are used in conjunction with generating privacy scores. In some embodiments, platform 102 includes a privacy reporting engine 602 that generates privacy reports for entities based on entity related data collection and private data isolation techniques as similarly described herein with respect to various embodiments. In some embodiments, platform 102 also includes a privacy scoring engine 902 that generates privacy scoring for entities based on entity related data collection and private data isolation techniques as similarly described herein with respect to various embodiments. In some embodiments, privacy reporting engine and privacy scoring engine are used in coordination to generate a privacy report that includes a privacy score. In some embodiments, platform 102 includes components as similarly described above with respect to FIG. 4 in addition to the privacy reporting engine 602 and privacy scoring engine 902 that can report on the verified private data associated with an entity that was collected and extracted, as further described below.

Figure 10:
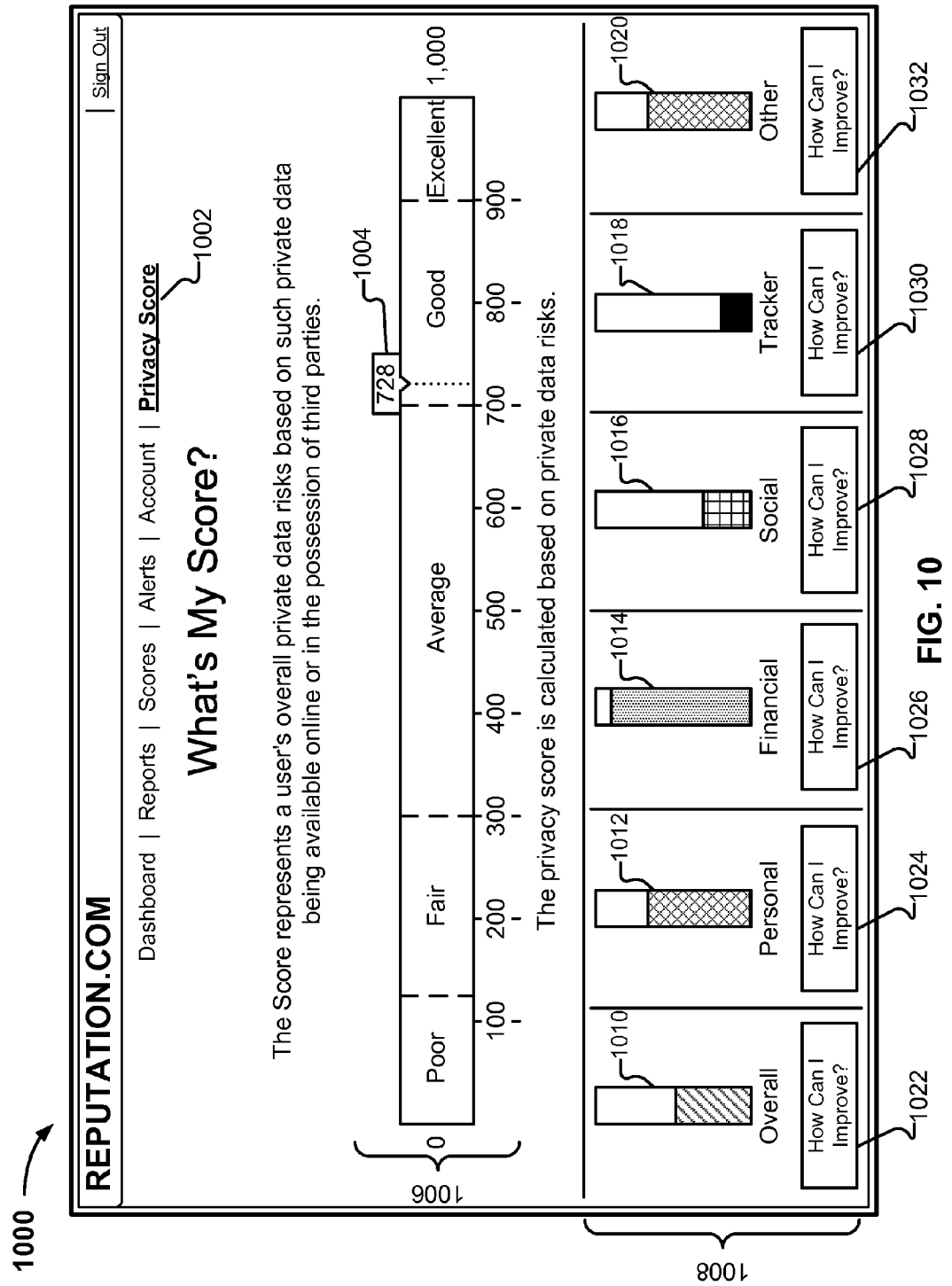
FIG. 10 illustrates an example of an interface as rendered in a browser of a privacy report with a privacy score in accordance with some embodiments.

FIG. 10 illustrates an example of an interface as rendered in a browser of a privacy report with a privacy score in accordance with some embodiments. In particular, Bob is presented with interface 1000 after logging in to his account on platform 102 using a browser application on client device 106 and clicking on tab option 1002 for a privacy score.

In some embodiments, whenever Bob accesses platform 102 (and/or based on the elapsing of a certain amount of time), the composite score shown at 1004 in FIG. 10 is refreshed. In particular, privacy scoring engine 902 retrieves, from database 214, private data pertaining to Bob and generates the various privacy scores shown in FIG. 10. Example ways of computing a composite privacy score are discussed below. Also, as will be described in more detail below, users are able to explore the factors that contribute to their privacy scores by manipulating various interface controls, and they can also learn how to improve their scores.

In region 1004 of interface 1000, a composite privacy score (728 points in this example) is depicted on a scale 1006 as shown. Example ways of computing a composite privacy score are described below. The composite privacy score provides Bob with a quick perspective, for example, on Bob's privacy risks. A variety of factors can be considered in determining a composite privacy score. Six example factors are shown in region 1008, each of which is discussed below. For each factor, Bob can see tips on how to improve his score with respect to that factor by clicking on the appropriate box (e.g., box 1022 for tips on improving score 1010). In the example shown in FIG. 10, a recommendation box is present for each score presented in region 1008. In some embodiments, such boxes are only displayed for scores that can/should be improved. For example, given that score 1014 is already very high, in some embodiments, box 1026 is omitted from the interface as displayed to Bob, or an alternate message is displayed, such as "no major privacy risks identified at this time."

Overall Score (1010): This value reflects the average or composite privacy risk score across all categories. As shown, if Bob clicks on box 1022, he will be presented with a suggestion(s), such as a list of recommendations to improve Bob's overall privacy score and minimize his privacy risks. In some embodiments, personalized advice may also be provided, such as recommending to Bob that he subscribe to automated privacy risk alerts. In some embodiments, automated privacy reporting alerts and/or privacy scoring alerts are provided as a subscription service. In some embodiments, automated privacy reporting alerts and/or privacy scoring alerts are provided as a free service (e.g., for a limited period of time).

As also shown in FIG. 10, various other categories of privacy risk scoring are presented in section 1008 of interface 1000, as discussed further below.

Personal (1012): This score indicates privacy risks associated with a user's personal related private data (e.g., mother's maiden name and father's birthdate, which are often selected by users as security questions for account/identity verification, and/or other personal data). For example, if Bob clicks on box 1024, he will be presented with a suggestion(s), such as the following: "Remove your birthdate information from your web site" or "Do not use your father's birthdate for purposes of a security question/identity verification."

Financial (1014): This score indicates privacy risks associated with a user's financial related private data. For example, if Bob clicks on box 1026, he will be presented with a suggestion(s), such as the following: "Close your account with third party X" and/or "Do not use your social security number as a username or password."

Social Factors (1016): This score indicates privacy risks associated with a user's social related private data. For example, by clicking on box 1028, Bob will be presented with an appropriate suggestion(s) for improvement.

Tracker (1018): This score indicates privacy risks associated with tracker related activities. For example, by clicking on box 1030, Bob will be presented with an appropriate suggestion(s) for improvement, such as to remove particular tracker cookies from his client/browser and/or to recommend that Bob opt out of being tracked using a service, such as described herein.

Other (1020): This score indicates privacy risks associated with various other private related data, such as health related private data and/or other private related data. In some embodiments, entities, such as Bob, can configure their account to identify new categories of interest, such as hobbies or other categories that Bob may deem to be private data that can be monitored by the privacy platform disclosed herein. For example, by clicking on box 1032, Bob will be presented with an appropriate suggestion(s) for improvement.

In various embodiments of interface 1000, additional controls for interactions are made available. For example, a control can be provided that allows a user to see specific extractions of private data and their source(s)—including private data from sources that contributed the most to/deviated the most from the overall score (and/or individual factors). As one example, a third party source that is weighted heavily in the calculation of a score or scores can be identified and presented to the user. The user could then attempt to resolve the unauthorized or undesired usage of the user's private data by that third party source, such as by using a service offered by a service provider such as Reputation.com to assist the user to remove such identified privacy risks. As another example, problematic tracker cookies can be identified and presented to the user, allowing the user to opt out of being tracked, such as using the browser cookie no track mechanism from a service provider such as Reputation.com to stop third party cookie tracking. As yet another example, if an otherwise unauthorized or undesired disclosure of certain private data is exposed by a third party source/site, Bob can be advised to avoid using such private data for security purposes (e.g., do not use such exposed private data for security questions for access to financial accounts, and/or other security related or identity verification purposes).

A variety of weights can be assigned to the above factors when generating the composite score shown in region 1004. Further, the factors described above need not all be employed nor need they be employed in the manners described herein.

Additional factors can also be used when generating a composite score. An example computation of a composite score is discussed below.

In some embodiments, scoring engine 902 computes a base score that is a weighted average of all of the private data related risks identified in each category of privacy risks, such as shown in FIG. 10 and discussed above. In some embodiments, certain categories are more heavily weighted, such as financial privacy risks, than other categories, such as social privacy risks. In some embodiments, certain types of private data risks are more heavily weighted, such as public disclosure or access to a user's social security number or username/password account credentials with a third party (e.g., if a particular third party had user account and password information, and Bob's account was compromised, that can be more heavily weighted even if with a non-financial account as such information may be reused by Bob for other accounts, such as financial accounts), than other types of private data risks, such as social related information. In some embodiments, where the private data or how it was accessed or publicly exposed is also weighted based on associated risks (e.g., if Bob's private data is found on page 1 of Google search results for Bob, then that is weighted more heavily than if such is found on page 100 of such Google search results).

As explained above, a variety of techniques can be used by scoring engine 902 in determining privacy scores. In some embodiments, scores for all types of entities are computed using the same sets of rules. In other embodiments, privacy score computation varies based on type of entity, category of user (e.g., profession, age, geography, and/or other categorization of users), configured criteria by the entity for that account (e.g., Bob can input custom configurations for his privacy reporting and privacy scoring for his account), geography of the entity, and/or other factors or considerations (e.g., privacy scores for adults using one approach and/or one set of factors, and privacy scores for doctors using a different approach and/or different set of factors). Scoring engine 902 can be configured to use a best in class entity when determining appropriate thresholds/values for entities within a given categorization. The following are yet more examples of factors that can be used in generating privacy scores.

In some embodiments, the privacy score is based on a scale, which is open ended score (e.g., the privacy score becomes higher as more privacy information for Bob becomes publicly available or is accessed by third parties). In some embodiments, marketing companies that are determined to have access to privacy information are weighted based on prominence, reputation, privacy policy, and/other analysis on such entities (e.g., the privacy platform can allocate different reputations to different third party data sources, such as Spokeo, Lexis Nexis, and/or other sources based on such criteria). In some embodiments, ad tracking networks/companies that are determined to have access to privacy information (e.g., are tracking a user such as Bob using tracker cookies) are weighted based on prominence, reputation, privacy policy, and/other analysis on such entities (e.g., ad tracking networks can be classified based on a reputation determined for each ad tracker such as based on the ad tracker's privacy policy and/or known/past behaviors).

Figure 11:
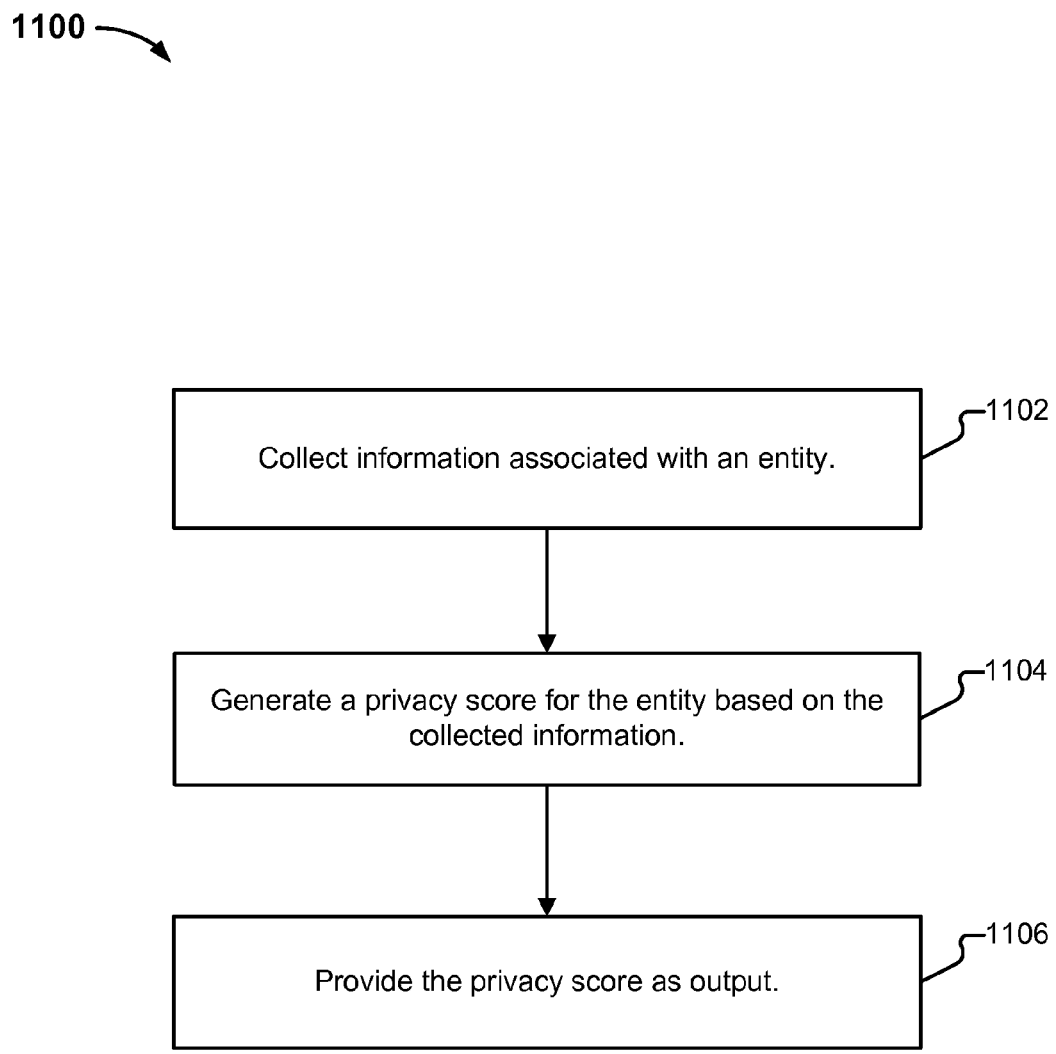
FIG. 11 illustrates a flow diagram of a process for privacy scoring in accordance with some embodiments.

FIG. 11 illustrates a flow diagram of a process for privacy scoring in accordance with some embodiments. In some embodiments, process 1100 is performed by platform 102. The process begins at 1102 when data obtained from each of a plurality of sites/sources is received. In particular, at 1102, information associated with an entity is collected. As one example, process 1100 begins at 1102 when Bob logs into platform 102 and, in response, scoring engine 902 retrieves private data associated with Bob from database 214. In addition to generating privacy scores on demand, privacy scores can also be generated as part of a batch process. As one example, scores across a set or group/class of users can be generated (e.g., for benchmark purposes) once a week. In such situations, the process begins at 1102 when the designated time to perform the batch process occurs and data is received from database 214. In various embodiments, at least some of the data received at 1102 is obtained on-demand directly from the sources/sites (instead of or in addition to being received from storage, such as database 214).

At 1104, a privacy score for the entity based on the collected information is generated (e.g., using privacy scoring engine 902). Various techniques for generating privacy scores are discussed above. Other approaches can also be used, such as by determining an average score for each of the categories of private data associated with Bob and combining those average scores (e.g., by multiplying or adding them and normalizing the result).

Finally, at 1106, the privacy score is output (e.g., using interface 1000). As one example, a privacy score is provided as output in region 1004 of interface 1000. As another example, scoring engine 902 can be configured to send privacy scores to users via email (e.g., using an alerting engine, such as alerter 432).

As will now be apparent to one of ordinary skill in the art in view of the embodiments described herein, various other forms of privacy scoring can be generated and output using the privacy platform and various techniques described herein. For example, information about sources determined to have private data associated with the entity can also be used to impact a privacy score (e.g., a reputation of such sources in terms of how such sources use private data of users can be used as relative weight in the privacy score in which a lower privacy score can result from a riskier third party having private data of a user). Further, the various privacy factors described above need not all be presented or output in the privacy score nor need they be employed in the manners described herein. Additional factors can also be used when generating a privacy score. Also, various other forms of scoring or scaling can also be used, such as letter grades, scales that are commensurate with FICO scoring, and/or various other approaches using the privacy platform and techniques disclosed herein.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for privacy scoring, comprising:
 a processor configured to:
  collect information associated with an entity from a plurality of sources, wherein the plurality of sources includes at least one third party source, and wherein the collected information includes private information associated with the entity; and
  perform a privacy risk analysis based at least in part on the collected private information, wherein the privacy risk analysis includes determining types of private information included in the collected private information, and wherein performing the privacy risk analysis includes evaluating the private information to determine privacy risks associated with the entity with respect to a plurality of categories;
  generate a privacy score based at least in part on the privacy risk analysis, wherein the privacy score comprises a composite privacy risk score across the plurality of categories, and wherein the composite privacy risk score is based at least in part on a base score that is a weighted average of at least a portion of the privacy risks determined with respect to the plurality of categories; and
 a memory coupled to the processor and configured to provide the processor with instructions.

2. The system recited in claim 1, wherein the processor is further configured to:
 determine, from the collected information, the private information associated with the entity.

3. The system recited in claim 1, wherein the processor is further configured to:
 output the privacy score.

4. The system recited in claim 1, wherein the processor is further configured to:
 output a privacy report that includes the privacy score.

5. The system recited in claim 1, wherein the processor is further configured to:
 output a privacy report that includes the privacy score, wherein the privacy score corresponds to an overall privacy score.

6. The system recited in claim 1, wherein the processor is further configured to:
 output a privacy report that includes the privacy score and a recommendation to improve the privacy score.

7. The system recited in claim 1, wherein the processor is further configured to:
 alert the entity based on the privacy score.

8. The system recited in claim 1, wherein the processor is further configured to:
 periodically collect information associated with the entity; and
 update the privacy score.

9. The system recited in claim 1, wherein the processor is further configured to:
 periodically collect information associated with the entity;
 update the privacy score; and
 alert the entity that the privacy score has been updated.

10. A method for privacy scoring, comprising:
 collecting information associated with an entity from a plurality of sources, wherein the plurality of sources includes at least one third party source, and wherein the collected information includes private information associated with the entity; and
 performing a privacy risk analysis based at least in part on the collected private information, wherein the privacy risk analysis includes determining types of private information included in the collected private information, and wherein performing the privacy risk analysis includes evaluating the private information to determine privacy risks associated with the entity with respect to a plurality of categories;
 generating, using a computer processor, a privacy score based at least in part on the privacy risk analysis, wherein the privacy score comprises a composite privacy risk score across the plurality of categories, and wherein the composite privacy risk score is based at least in part on a base score that is a weighted average of at least a portion of the privacy risks determined with respect to the plurality of categories.

11. The method of claim 10, further comprising:
 determining, from the collected information, the private information associated with the entity.

12. The method of claim 10, further comprising:
 outputting the privacy score.

13. The method of claim 10, further comprising:
outputting a privacy report that includes the privacy score.

14. The method of claim 10, further comprising:
outputting a privacy report that includes the privacy score, wherein the privacy score corresponds to an overall privacy score.

15. The method of claim 10, further comprising:
outputting a privacy report that includes the privacy score and a recommendation to improve the privacy score.

16. A computer program product for privacy scoring, the computer program product being embodied in a non-transitory computer readable storage medium and comprising computer instructions for:
collecting information associated with an entity from a plurality of sources, wherein the plurality of sources includes at least one third party source, and wherein the collected information includes private information associated with the entity; and
performing a privacy risk analysis based at least in part on the collected private information, wherein the privacy risk analysis includes determining types of private information included in the collected private information, and wherein performing the privacy risk analysis includes evaluating the private information to determine privacy risks associated with the entity with respect to a plurality of categories;
generating a privacy score based at least in part on the privacy risk analysis, wherein the privacy score comprises a composite privacy risk score across the plurality of categories, and wherein the composite privacy risk score is based at least in part on a base score that is a weighted average of at least a portion of the privacy risks determined with respect to the plurality of categories.

17. The computer program product recited in claim 16, further comprising computer instructions for:
determining, from the collected information, the private information associated with the entity.

18. The computer program product recited in claim 16, further comprising computer instructions for:
outputting the privacy score.

19. The computer program product recited in claim 16, further comprising computer instructions for:
outputting a privacy report that includes the privacy score.

20. The computer program product recited in claim 16, further comprising computer instructions for:
outputting a privacy report that includes the privacy score, wherein the privacy score corresponds to an overall privacy score.

* * * * *

UNITED STATES PATENT AND TRADEMARK OFFICE
CERTIFICATE OF CORRECTION

| | | |
|---|---|---|
| PATENT NO. | : 8,925,099 B1 | Page 1 of 1 |
| APPLICATION NO. | : 13/828365 | |
| DATED | : December 30, 2014 | |
| INVENTOR(S) | : Saxe et al. | |

It is certified that error appears in the above-identified patent and that said Letters Patent is hereby corrected as shown below:

On the title page, item 56

References cited, under Foreign Patent Documents, delete "WO02001046868" and insert --WO2001046868--, therefor.

References cited, under Foreign Patent Documents, delete "2/2001" and insert --6/2001--, therefor.

Signed and Sealed this
Twenty-eighth Day of June, 2016

Michelle K. Lee
*Director of the United States Patent and Trademark Office*